United States Patent Office 3,436,851
Patented Apr. 8, 1969

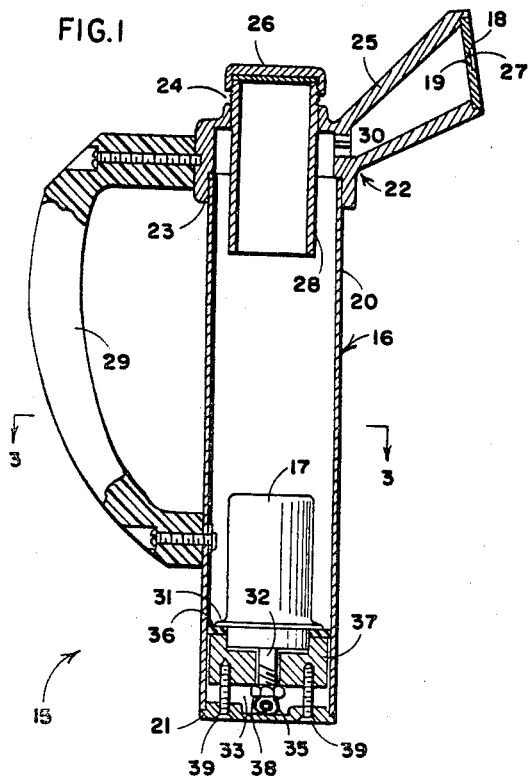
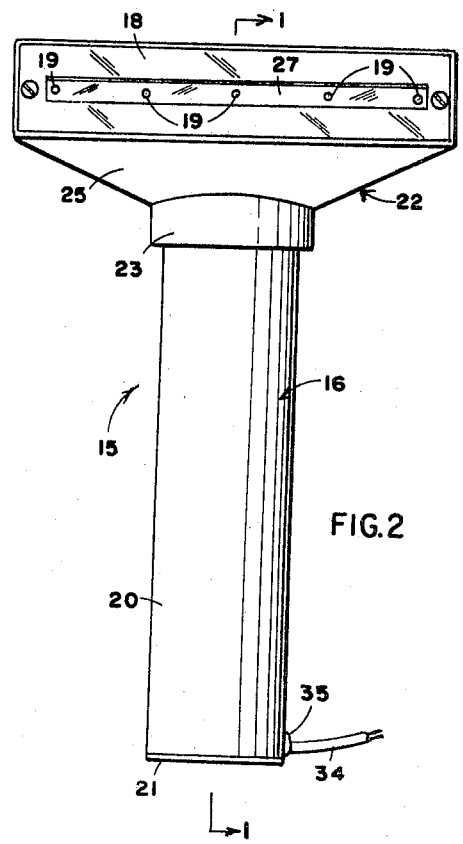
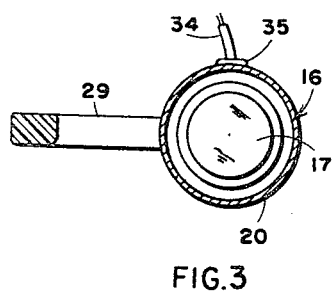

3,436,851
HAND ELECTRIC STEAMING AND PRESSING DEVICE TO TOUCH-UP HANGING GARMENTS
Jack J. Gilbert, Spring Valley, N.Y., assignor to Bernard Frank, Shamokin, Pa.
Filed Apr. 18, 1967, Ser. No. 631,769
Int. Cl. A47j 51/22; D06f 75/00
U.S. Cl. 38—69                    7 Claims

ABSTRACT OF THE DISCLOSURE

An upright tubular casing having a side handle, serves as a tank for water to be heated by an electric heater element housed at tank bottom. A head atop the casing presents a laterally directed steam discharge nozzle, and a closure cap on a relatively short tube extending concentrically into the tank. This tube serves to indicate the filling level of the tank, and steam coming therein acts to keep the steam flow to the nozzle warm. The forward end of the nozzle is closed by a flat horizontally elongated plate in nearly a vertical plane, which preferably is slightly tilted upwardly towards the tank. This plate, serving as the ironing surface, has a plurality of relatively small holes therethrough, spaced along a horizontal line and discharging into a shallow channel or depression in and along the exposed face of said plate, whereby the steam discharge onto a garment is band-formed rather than spaced small localizations.

---

The present invention relates to, and its principal object is to provide a novel and improved hand-held electrically-heated, steam emitting pressing device, adapted especially for touch-up work on a hanging garment, drape and the like. For example, this device is to iron and steam out wrinkles or to accentuate a crease in garments taken out of luggage or out of a closet or off a display rack. It is also useful to freshen trouser creases and for last minute work to be done on garments being fitted.

Another object thereof is to provide an electric steaming and pressing device of novel and improved construction, which is compact, simple in structure, reasonable in cost to manufacture, easy to use and efficient in carrying out the functions for which it is designed.

Other objects and advantages will become apparent as this disclosure proceeds.

A detailed description will now be given of a preferred embodiment of this device, and its mode of operation, for which I shall refer to the drawing herein.

In the accompanying drawing forming part of this specification, similar characters of reference indicate corresponding parts in all the views.

FIG. 1, is a side elevational view shown mostly in section of a steaming and pressing device embodying the teachings of this invention. The sectional showing is taken at line 1—1 in FIG. 2.

FIG. 2 is a front elevational view of said device.

FIG. 3 is a section taken at line 3—3 in FIG. 1.

In the drawing, a preferred embodiment of this invention indicated generally by the numeral 15, has a tank denoted generally at 16, for water to be vaporized by an electric heating element 17 wherein said tank; the steam generated being utilized to heat the ironing plate 18, and to emit live steam through the apertures 19 in said plate. The tank specifically shown, is an upright elongated metal tube 20, whose bottom end is closed by a plug 21, and whose top end carries a cast metal head member indicated generally as 22, which is a sort of tubular T-shaped structure, whose aligned branches are 23, 24, and whose third branch is denoted as 25. The upper end of the tube 20 is connected to the branch 23. The branch 24 is closed by a removable cap 26. The distal opening of the branch 25 is in an upright plane, of rectangular shape, long horizontally, said opening being closed by the pressing plate 18, which is perforated by a series of small holes 19, spaced along the horizontal, and all opening into a shallow channel or depression 27 in the pressing face of the ironing plate 18, which is preferably flat and polished. The said branch 24 being reduced in relation to the branch 23, has an inward tubular extension 28, through and concentric with the branch 23, and extending downwardly into the tank 16, to a level up to which the tank shall be filled when the device 15 is to be set up for use. The branch 25 may be referred to as the steam discharged nozzle, besides the holder for the ironing plate 18, which is at the front of the device 15. At the back of said device, is a suitable handle 29, whereby the device is held in hand for manipulation. At the steam intake end of the branch 25, there may be a partition with a few spaced apertures 30.

The heating element 17 is within a metal casing having a flange 31. Its leads not shown, are through an exteriorally threaded tubular neck 32 on said heater casing, from which they are led into the connection chamber 33, where they are connected to a duplex wire 34 which is for connection to a current supply for actuation of said heater; said duplex wire being through the insulative bushing 35 engaged in an opening through the wall of the tube 20. The numeral 36 indicates a gasket of heat-resistant rigid material of small resilient quality, force-fitted into the tube 20, and positioned low in said tube. The numeral 37 designates a centrally-perforated metal cup of appreciable mass, for the bottom of the heater casing to set in as shown. The flange 31 rests on the gasket 36, but the bottom of the casing is slightly spaced from the floor of the cup. The nut 38 maintains the assembly securing the heater element, and the screws 39 fix the plug 21, to hold the bottom end of the tube 20 closed. Said gasket 36 maintains the connection chamber 33, water-free.

To prepare the device 15 for use, the cap 26 is removed and the tank 16 is filled with water up to the bottom rim of the tube 28, a condition which can be observed by looking down the tube 28. Then the cap is screwed back on, and current is supplied to the heater 17. Soon, steam will be continuously generated in the tank 16, and will rise therein. Part will pass into the nozzle branch 25, which will heat the ironing plate 18, and live steam will issue through the holes 19 as separate jets. The other part of the steam will occupy the top-closed space in the tube 28, and serve as an auxiliary heat source to keep hot the steam which is for the nozzle branch.

A garment, suspended from a hanger, or being fitted on wearer or tailor's dummy, to be touched up to take out wrinkles or accentuate a crease, is pulled down at a region below the part to be pressed and steamed, and the device is applied so the pressing plate is against the garment. Such contact will cause the separate steam streams issuing from the holes 19, to merge in the recess 27, whereupon a band of steam will impinge on the region being treated on the garment. The constriction imposed by the few small openings 30, and the few holes 19, causes the steam to impinge on the garment with considerable velocity and pressure.

A suitable material for all the metal parts, is aluminum. The gasket 36 may be made of composition rubber, and the handle 29 may be molded of plastic. For a practical size, the tank's tube 20 is suggested to be about two inches in diameter, eight inches tall, and its wall thickness one-sixteenth of an inch.

This invention is capable of numerous forms and various applications without departing from the essential features herein disclosed. It is therefore intended and desired that the embodiment shown herein shall be deemed merely illustrative and not restrictive.

I claim:
1. In a hand-held steaming and pressing device of the character described, an upright casing serving as a water tank, having an opening for receiving a supply of water therein, an openable closure means closing said opening; said casing having a lateral branch extending from its upper region; the distal opening of said branch being in a substantially upright position, a smooth plate having perforations, serving as the pressing surface of said device; said plate closing said distal opening of said branch; said perforations being for issuance of steam therethrough from the tank, an electric heater element associated with the tank, whereby on being actuated when there is water in the tank, will heat and vaporize said water whereupon the steam offered by the vaporization will issue through the perforations in the pressing plate and a heat-conductive tube positioned downwardly into the tank, spaced from the peripheral wall of the tank and extending a predetermined distance below the connection of said branch with the tank; the upper end of said tube being said opening through which water is entered into the tank; said closure means being at the upper end of said tube, whereby steam entering said tube will serve to keep hot that portion of the steam entering said branch.

2. A steaming and pressing device as defined in claim 1, wherein the lower end of said tube is at such position that it serves to indicate the level to which the tank is to be filled with water; such lower end of the tube being visible through the upper end of said tube when the closure means is clear of said opening.

3. A portable hand held fabric treating device of the character described, having structure disposed to direct hot steam on a garment or fabric without pressing or ironing, comprising in combination, a reservoir tank containing a supply of water, means for supplying and retaining water within the tank for release only in the form of steam, a heating element extending in said reservoir to be immersed in said water and having heating capacity sufficient to form water vapor under pressure from the supply of water in said tank, a generally flat plate remotely located from said heating element and having a plurality of perforations distributed over its surface to direct steam over a substantial area of an adjacent fabric, a steam conveyance passageway extending from said tank to direct steam solely by its vapor pressure through said perforations and including means mounting said plate at a position when the reservoir tank is held by hand permitting the surface of a fabric to be stroked with said flat plate to direct steam thereupon over a substantial area as it is passed from said perforations.

4. A device as defined in claim 3, including a metallic ironing plate structure adjacent said perforations for contact against the garment, and means heating the metallic plate structure solely by means of the vapor under pressure passing through said passageway.

5. A device as defined in claim 3, having an upright cylindrical chamber for holding the water in the lower portion by force of gravity with an upper head containing said plate.

6. A device as defined in claim 5, wherein said head is removable with structure mounting the head inclined at an angle from the vertical to hold said plate at its extremity substantially parallel with the axis of said cylinder.

7. A device as defined in claim 5, having a heat insulating handle position affixed to and spaced from said cylindrical chamber.

References Cited

UNITED STATES PATENTS

| | | | |
|---|---|---|---|
| 2,660,818 | 12/1953 | Gross | 38—69 |
| 3,170,257 | 2/1965 | Dziadulonis et al. | 38—77 |
| 3,272,964 | 9/1966 | Carlos et al. | 38—77 X |

PATRICK D. LAWSON, *Primary Examiner.*